United States Patent
Brown et al.

(10) Patent No.: US 6,302,336 B1
(45) Date of Patent: Oct. 16, 2001

(54) WATERING CONTAINER WITH A ROTATABLE NOZZLE HAVING A PLURALITY OF WATER DELIVERY PATTERNS

(75) Inventors: Jerrold G. Brown, Medina; Alex P. Digiacomo, Jr., Akron, both of OH (US)

(73) Assignee: Akro-Mils, Akron, OH (US)

( * ) Notice: Subject to any disclaimer, the term of this patent is extended or adjusted under 35 U.S.C. 154(b) by 0 days.

(21) Appl. No.: 08/908,252

(22) Filed: Aug. 7, 1997

(51) Int. Cl.[7] ................................................. A01G 25/14
(52) U.S. Cl. ..................... 239/377; 239/302; 239/375; 239/390; 239/391; 239/394
(58) Field of Search ......................... 239/375, 376, 239/377, 390, 391, 392, 393, 394, 395, 396, 302; 222/566, 570, 571, 480; D23/200, 211, 212; D7/300, 301, 302

(56) References Cited

U.S. PATENT DOCUMENTS

| D. 56,774 | * | 12/1920 | Sroka | D23/211 |
|---|---|---|---|---|
| 92,194 | * | 7/1869 | Kaiser | 239/377 |
| 151,823 | * | 9/1874 | Baldwin | 239/392 |
| D. 251,129 | * | 2/1979 | Behling | D23/11 |
| D. 264,492 | * | 5/1982 | Welch | D23/11 |
| D. 266,017 | * | 8/1982 | Kellogg | D23/11 |
| D. 266,018 | * | 8/1982 | Dilyard | D23/11 |
| D. 266,450 | * | 10/1982 | Swett et al. | D23/11 |
| D. 278,928 | * | 5/1985 | Gerber | D23/11 |
| D. 279,210 | * | 6/1985 | Carlson | D23/11 |
| D. 279,211 | * | 6/1985 | Carlson | D23/11 |
| D. 279,212 | * | 6/1985 | Carlson | D23/11 |
| D. 279,310 | * | 6/1985 | Murphy | D23/11 |
| D. 279,311 | * | 6/1985 | Schwartzburg | D23/11 |
| D. 282,957 | * | 3/1986 | Carlson | D23/11 |
| D. 282,958 | * | 3/1986 | Carlson | D23/212 |
| D. 293,017 | * | 12/1987 | Janowitz | D23/212 |

(List continued on next page.)

FOREIGN PATENT DOCUMENTS

248717  *  3/1947  (CH) ..................................... 239/375

*Primary Examiner*—Andres Kashnikow
*Assistant Examiner*—Robin O. Evans
(74) *Attorney, Agent, or Firm*—Oldham & Oldham Co., L.P.A.

(57) ABSTRACT

A watering container with a rotatable nozzle having a plurality of water delivery patterns. In particular, a rotatable nozzle having a plurality of water delivery patterns is rotationally attached to a water spout on a watering container. A user can turn the rotatable nozzle to select the desired water delivery pattern. In a preferred embodiment of the watering container, the user may select either a steady stream water pattern or a dispersed rosette water spray pattern. The watering container includes an internal fluid reservoir which can vary in volume based on the needs of the user. Water exits the internal fluid reservoir and flows through the water spout and then through the water delivery pattern selected by the user on the rotatable nozzle when the watering container is properly tilted. An integral elongated handle on the watering container enables the user to reduce stress on their hand and wrist during the tilting process. The dispersed rosette water spray pattern allows a relatively large surface area to be watered with a plurality of relatively small diameter continuous water streams, whereas the steady stream water pattern provides one relatively large diameter continuous water stream to be poured. The watering container includes a fill opening on the top portion of the internal fluid reservoir to allow the user to fill the watering container with water or other fluids. This fill opening is oriented such that a substantial portion of the opening is not blocked by the integral elongated handle to facilitate filling the watering container with water and other fluids and also permit the user to tilt the watering container at a greater angle before water spills out of the fill opening rather than through the water spout.

4 Claims, 3 Drawing Sheets

U.S. PATENT DOCUMENTS

| | | | |
|---|---|---|---|
| D. 295,547 | * | 5/1988 | Cunning .............................. D23/212 |
| D. 315,755 | * | 3/1991 | Raffo et al. ........................ D21/120 |
| D. 318,810 | * | 8/1991 | Carlson .............................. D23/212 |
| D. 320,430 | * | 10/1991 | Renfrew ............................. D23/212 |
| D. 320,431 | * | 10/1991 | Mattei ................................ D23/212 |
| D. 357,729 | * | 4/1995 | Boyd .................................. D23/212 |
| 390,591 | * | 10/1888 | Haberman ....................... 239/377 X |
| 598,126 | * | 2/1898 | Whitney .............................. 239/377 |
| 1,702,523 | * | 2/1929 | Schafer .............................. 239/377 |
| 2,029,219 | * | 1/1936 | Bourland ............................ 222/480 |
| 2,134,281 | * | 10/1938 | Illch .................................... 222/571 |
| 2,593,607 | * | 4/1952 | Pruett ................................ 222/571 |
| 2,664,230 | * | 12/1953 | Heim .................................. 222/571 |
| 2,736,447 | * | 2/1956 | De Brock ........................... 222/571 |
| 2,737,417 | * | 3/1956 | Gundersen ........................ 239/377 |
| 2,817,465 | * | 12/1957 | Gray ................................ 222/571 X |
| 2,965,310 | * | 12/1960 | Gettelman .......................... 239/391 |
| 4,030,664 | * | 6/1977 | Tisbo et al. ........................ 239/289 |
| 4,700,892 | * | 10/1987 | Cunning ............................. 239/289 |

* cited by examiner

WATERING CONTAINER WITH A ROTATABLE NOZZLE HAVING A PLURALITY OF WATER DELIVERY PATTERNS

BACKGROUND AND SUMMARY OF THE INVENTION

The present invention generally relates to a watering container with a rotatable nozzle which a user is able to use to choose between a plurality of water delivery patterns by turning the rotatable nozzle to a desired position. More particularly, the present invention relates to a watering container which includes an integral elongated handle which provides a user with greater control over the amount of water which can be dispensed from the watering container, reducing the amount of stress exerted on the user's hand and wrist, a rotatable nozzle preferably including a large diameter steady stream water pattern opening and a dispersed rosette water spray pattern and the dispersed rosette water spray pattern including a plurality of apertures which allow water to exit the watering container in a dispersed fashion to cover a relatively large surface area.

Plants and flowers demand differing amounts of care in order to flourish. Horticulturists and gardeners have multiple ways of delivering water and other liquids plants need. Devices ranging from buckets and hoses, all the way to advanced sprinkler systems, have been used to deliver water to plants at certain locations, times and amounts. Traditional prior art watering containers have also been widely used to carry and deliver water to plants and flowers. Such known prior art watering containers generally include a reservoir capable of storing a predetermined volume of water, a handle by which a user grasps the watering container and a pour spout, perhaps including a removable sprinkling head, through which water is poured onto, for example, shrubs, flowers and other types of plants. Such prior art water containers have posed several problems for users. For example, it is normally necessary to physically remove the removable sprinkling head to convert such prior art watering containers from a dispersed water delivery pattern to a steady stream water delivery pattern. As a result, such removable sprinkling heads often become misplaced and/or lost and, thus, are unavailable for later use. In addition, it is difficult to fill many prior art watering containers since the fill opening is often substantially blocked by the watering container handle. The watering container with nozzle having a plurality of water delivery patterns overcomes these and other problems present in the prior art as set forth below.

The present invention is directed to a watering container with a rotatable nozzle having a plurality of water delivery patterns. In particular, a rotatable nozzle having a plurality of water delivery patterns is rotationally attached to a water spout on a watering container. A user can turn the rotatable nozzle to select the desired water delivery pattern. In a preferred embodiment of the watering container, the user may select either a steady stream water pattern or a dispersed rosette water spray pattern. The watering container includes an internal fluid reservoir which can vary in volume based on the needs of the user. Water exits the internal fluid reservoir and flows through the water spout and then through the water delivery pattern selected by the user on the rotatable nozzle when the watering container is properly tilted. An integral elongated handle on the watering container enables the user to reduce stress on their hand and wrist during the tilting process. The dispersed rosette water spray pattern allows a relatively large surface area to be watered with a plurality of relatively small diameter continuous water streams, whereas the steady stream water pattern provides one relatively large diameter continuous water stream to be poured. The watering container includes a fill opening on the top portion of the internal fluid reservoir to allow the user to fill the watering container with water or other fluids. This fill opening is oriented such that a substantial portion of the opening is not blocked by the integral elongated handle to facilitate filling the watering container with water and other fluids.

It is, therefore, an object of the present invention to provide a watering container with a rotatable nozzle having a plurality of water delivery patterns to facilitate the application of water and other fluids to plants and flowers such that a user can turn the rotatable nozzle to select the desired water delivery pattern.

It is another object of the present invention to provide a watering container having an integral elongated handle which can be readily gripped and manipulated to deliver the desired amount of water and other fluids while at the same time minimizing the amount of stress on a user's hand and wrist.

It is yet another object of the present invention to provide a watering container with a rotatable nozzle which can be turned by a user to choose from a plurality of water delivery patterns and which provides water flow through the rotatable nozzle with little or no leakage.

It is still another object of the present invention to provide a watering container with a rotatable nozzle having a dispersed rosette water spray pattern which includes a plurality of relatively small diameter openings which are substantially free from obstructions and/or flash resulting from the molding process.

It is yet another object of the present invention to provide a watering container with a rotatable nozzle having a dispersed rosette water spray pattern which includes a plurality of relatively small diameter openings which are substantially perpendicular at all points to a curved outer surface of the rotatable nozzle to provide a dispersed water spray pattern which will cover a relatively large surface area.

DETAILED DESCRIPTION OF THE DRAWINGS

Figure 3:
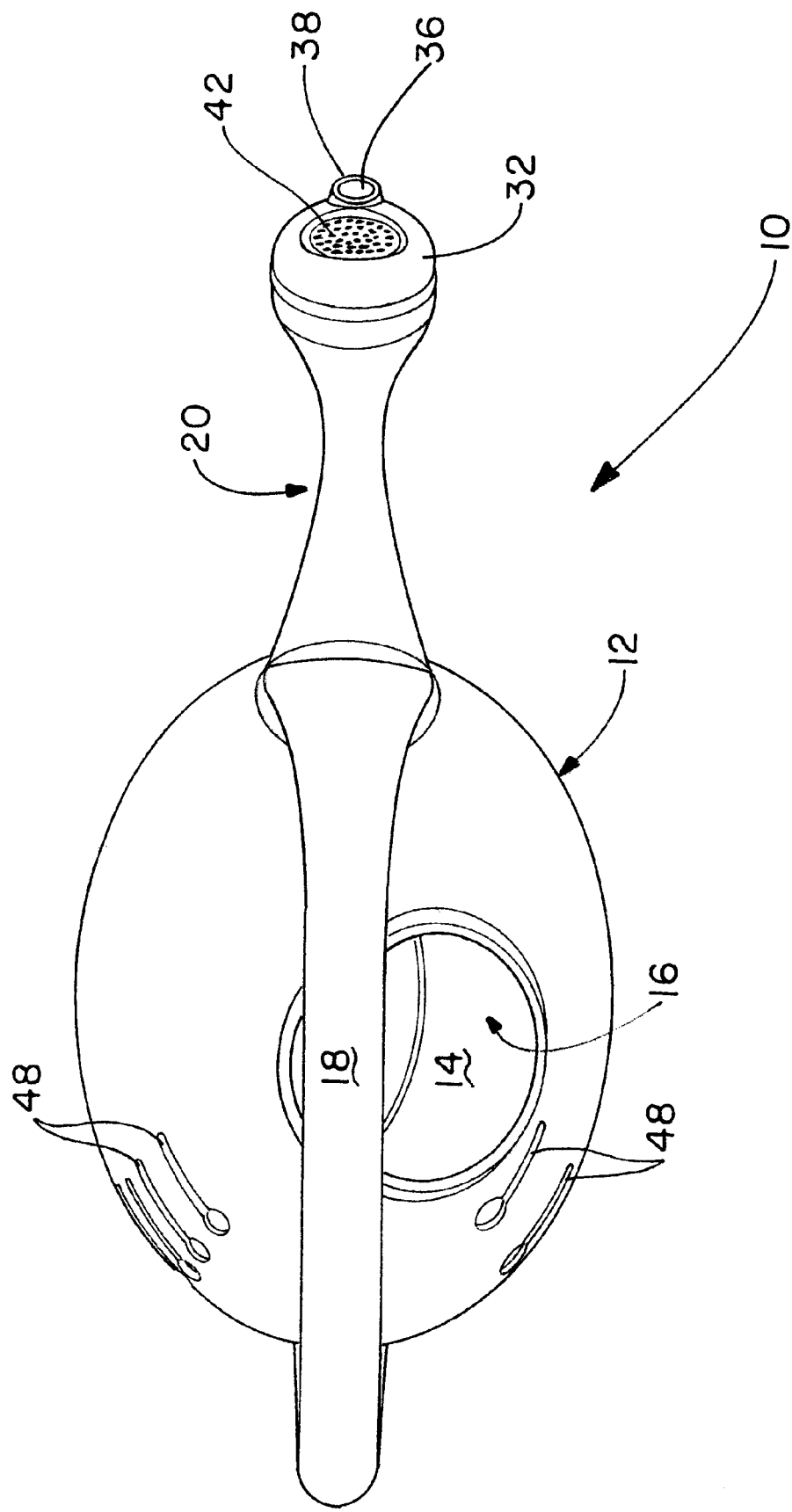
FIG. 3 is a top view of the watering container with a rotatable nozzle having a plurality of water delivery patterns in accordance with the preferred embodiment of the invention shown in FIG. 1.

In the following detailed description of a preferred embodiment of the present invention, reference is made to the accompanying drawings which, in conjunction with this detailed description, illustrate and describe a preferred embodiment of a watering container with a rotatable nozzle having a plurality of water delivery patterns, generally identified by reference number 10, in accordance with a preferred embodiment of the present invention. Watering container with a rotatable nozzle having a plurality of water delivery patterns 10 includes body portion 12 having hollow interior fluid reservoir 14. Watering container with a rotatable nozzle having a plurality of water delivery patterns 10 also includes fill opening 16 through the top of body portion 12. In the preferred embodiment of watering container with a rotatable nozzle having a plurality of water delivery patterns 10 shown in the drawings, body portion 12 is symmetrical. However, it will be recognized by those having a level of ordinary skill in the relevant art that other non-symmetrical shapes for body portion 12 could also be utilized in accordance with the teachings of the present invention. In the preferred embodiment of watering container with a rotatable nozzle having a plurality of water delivery patterns 10 shown in the drawings, fill opening 16 is non-symmetrical in relation to integral elongated handle 18 to permit better access to fill opening 16. In particular, as seen in FIG. 3, fill opening 16 covers a greater portion of the right side of body portion 12 as compared to the left side of body portion 12. This non-symmetrical placement of fill opening 16 is thought to be beneficial in that if water splashes out of fill opening 16, for example when hollow internal fluid reservoir 14 is full and water container with a rotatable nozzle having a plurality of water delivery patterns 10 is being carried, the water would tend to splash away from a user carrying water container with a rotatable nozzle having a plurality of water delivery patterns 10 with his or her right hand, as the majority of right-handed individuals would tend to do. Fill opening 16 could be made, if desired, non-symmetrical on the other side of integral elongated handle to make a "left-hand" model of watering container with a rotatable nozzle having a plurality of water delivery patterns 10. Non-symmetrical placement of fill opening 16 also facilitates filling hollow internal fluid reservoir 14 with water and/or other fluids.

Watering container with a rotatable nozzle having a plurality of water delivery patterns 10 includes integral elongated handle 18 which is connected to body portion 12 at two (2) locations on body portion 12. The first location is at the base of water spout 20 and the second location is along a line of symmetry near the rear bottom of body portion 12. Integral elongated handle 18 provides several advantages. Integral elongated handle 18 allows easier access for a user to grip integral elongated handle 18 and carry and use watering container with a rotatable nozzle having a plurality of water delivery patterns 10, in many cases, with one (1) hand. In particular, the configuration of integral elongated handle 18 substantially corresponds to the configuration of body portion 12. This causes the center of gravity of the water and/or fluid present in hollow internal fluid reservoir 14 to be below the user's hand when the user has grasped integral handle portion 18 at substantially any position along its length. In addition, a user can hold integral elongated handle 18 at various locations along its length, thus reducing the distance a person needs to tilt watering container with a rotatable nozzle having a plurality of water delivery patterns 10 so the desired amount of water can be poured out. Therefore, users with arthritis or other physical problems which cause reduced mobility in their wrist and arm would be able to use watering container with a rotatable nozzle having a plurality of water delivery patterns 10 with less discomfort.

Water spout 20 is connected to the front of body portion of watering container with a rotatable nozzle having a plurality of water delivery patterns 10 and extends upward and outward from hollow internal fluid reservoir 14. Water spout 20 has hollow interior portion 22 which is open to and receives water from hollow internal fluid reservoir 14. Water spout 20 includes small diameter portion 24 adjacent to and extending from hollow internal fluid reservoir 14 and large diameter portion 26 on the end of water spout 20 distal from hollow internal fluid reservoir 14. Upper end portion 28 of water spout 20 is preferably substantially enclosed, but includes water spout opening 30, which results in approximately ½ to ⅞ of upper end portion 28 of water spout 20 being obstructed. Water thus exits through upper end portion 28 through water spout opening 30.

Figure 1:
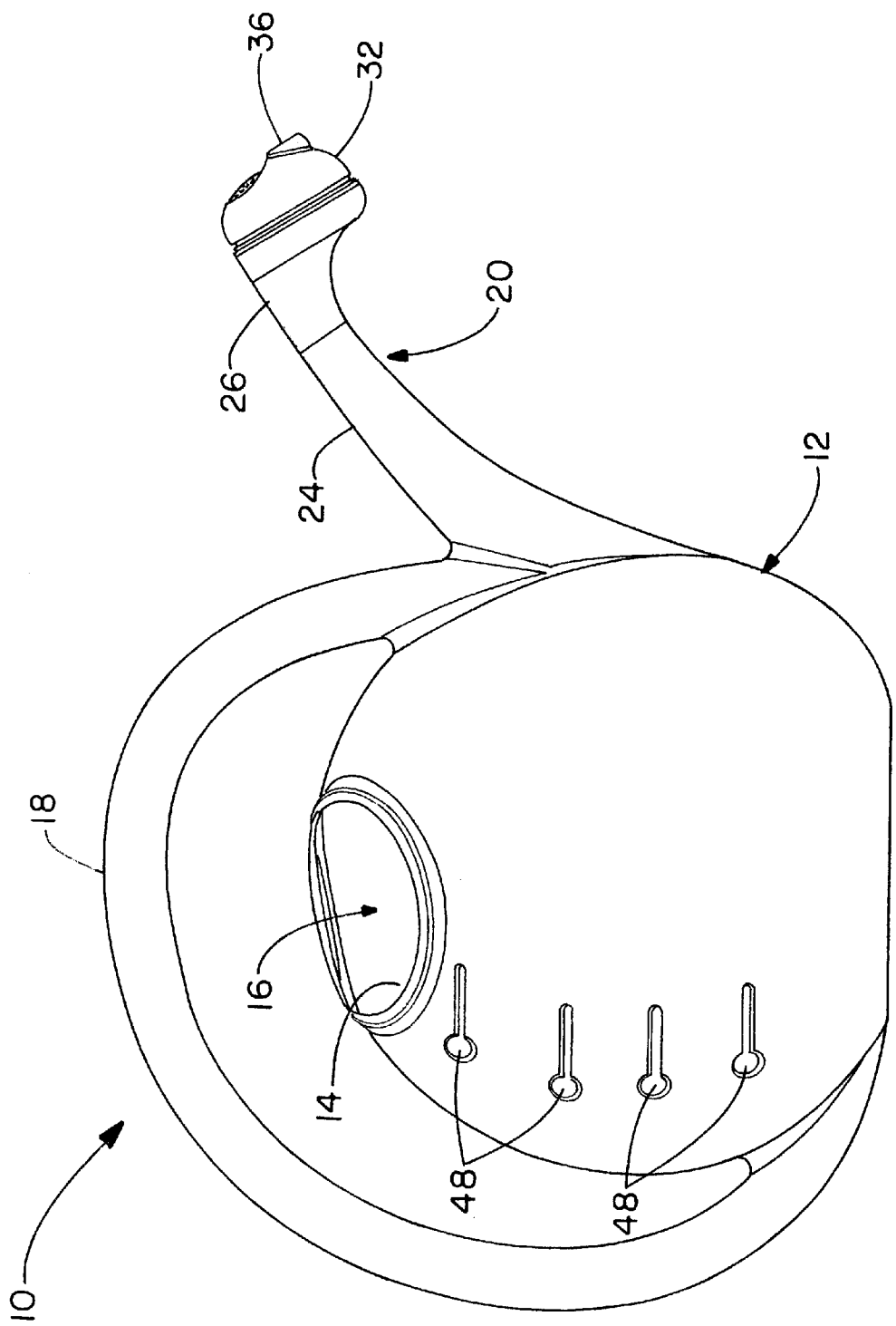
FIG. 1 is a side view of a watering container with a rotatable nozzle having a plurality of water delivery patterns in accordance with a preferred embodiment of the present invention.
Figure 4:
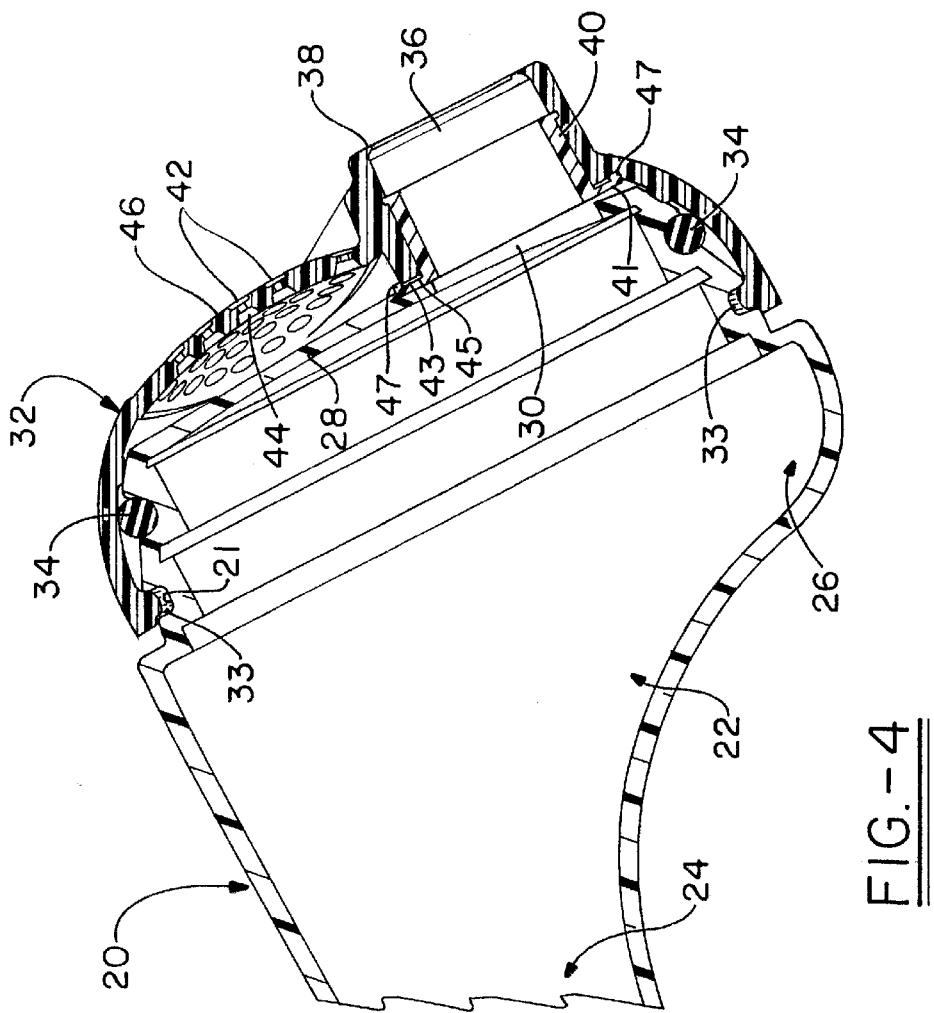
FIG. 4 is a cross-sectional view of the rotatable nozzle for the watering container with a rotatable nozzle having a plurality of water delivery patterns in accordance with the preferred embodiment of the present invention shown in FIG. 1.
Figure 2:
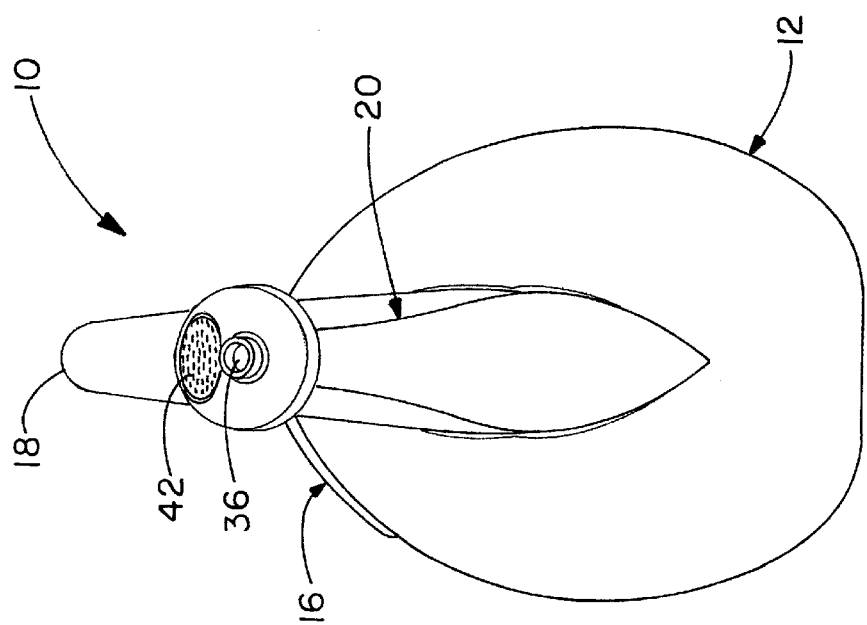
FIG. 2 is a front view of the watering container with a rotatable nozzle having a plurality of water delivery patterns in accordance with the preferred embodiment of the present invention shown in FIG. 1.

Rotatable nozzle 32 is connected over upper end portion 28 of water spout 20. As seen in FIG. 4, the connection of rotatable nozzle 32 includes retention ring 33 on the interior surface of rotatable nozzle 32 which resiliently engages with groove 21 on the outside diameter of water spout 20 such that rotatable nozzle 32 rotates in relation to water spout 20, but rotatable nozzle 32 is not readily removable from water spout 20. In addition, O-ring seal 34 is positioned between the interior surface of rotatable nozzle 32 and the outside diameter of water spout 20 to preclude water leakage from rotatable nozzle. Applicant has found it beneficial to use a prelubricated O-ring for O-ring seal 34 to minimize mechanical "locking" between rotatable nozzle 32 and water spout 20, particularly if water container with a nozzle having a plurality of water delivery patterns has not been used for several weeks. Rotatable nozzle 32 preferably includes two (2) water delivery patterns to permit the water in hollow interior fluid reservoir 14 to be discharged as desired. When a user desires a particular water delivery pattern he or she turns rotatable nozzle 32 so the desired water delivery pattern is aligned with water spout opening 30. In order to minimize interference between rotatable nozzle 32 and water spout opening 30, applicants have found that it is beneficial to counterbore water spout opening 30 from the exterior to remove the sharp edge otherwise present around water spout opening 30.

The first water delivery pattern is a steady stream water pattern where the water from hollow interior fluid reservoir 14 passes through relatively large diameter opening 36. Relatively large diameter opening 36 provides for a steady stream of water, and the volume of this steady stream can be varied by changing the diameter of the relatively large diameter opening 36. Inwardly projecting "no-drip" lip 38 is preferably present near the exit portion of the relatively large diameter opening 36, as shown in FIG. 4, to minimize dripping when the pouring of a steady stream of water is ended, Also, gasket 40 is securely positioned inside relatively large diameter opening 36, as shown in FIG. 4. Gasket 40 includes outwardly projecting portion 41 which seals against upper end portion 28 of water spout 20 to preclude leakage from relatively large diameter opening 36 when relatively large diameter opening 36 is not aligned with water spout opening 30. In particular, outwardly projecting portion 41 includes two (2) substantially "v-shaped" seal surfaces 43, 45 which engage with upper end portion 28 of water spout 20 to preclude leakage from relatively large diameter opening 36 when relatively large diameter opening 36 is not aligned with water spout opening 30 and leakage from the plurality of relatively small diameter openings 42 when relatively large diameter opening 36 is aligned with water spout opening 30. In addition, gasket 40 includes retaining lip 47 which upwardly projects from the perimeter of outwardly projection portion 41 to assist in retaining gasket 40 on relatively large diameter opening 36 and preclude the "collapse" of gasket 40 due to contact with upper end portion 28 of water spout 20. In the preferred embodiment of watering container with a rotatable nozzle having a plurality of water delivery patterns 10 shown in the drawings, rotatable nozzle 32 has a substantially circular cross-sectional configuration. However, other cross-sectional configurations for rotatable nozzle 32, for example square or triangular cross-sectional configurations, could be used for rotatable nozzle 32 if desired.

The second water delivery pattern in rotatable nozzle 32 is preferably a rosette water spray pattern. This rosette water spray pattern consists of a pattern of a plurality of relatively small diameter openings 42 which provide for a water spray which covers a relatively large surface area. In order to enable the rosette water spray pattern, the pattern of a plurality small diameter openings 42 is aligned with water spout opening 30. Thus, in the preferred embodiment of water container with rotatable nozzle having a plurality of water delivery patterns 10 shown in the drawings, the pattern of a plurality of relatively small diameter openings 42 is positioned at the bottom of rotatable nozzle 32 when the rosette water spray pattern is desired. The pattern of a plurality of relatively small diameter openings 42 provides for a corresponding number of continuous relatively small diameter water streams to exit from rotatable nozzle 32. This is usually used for watering flowers and recently planted nursery stock which require a more delicate flow of water.

It should be noted that the placement of water spout opening 30 in upper end portion 28 of water spout 20 could be placed in other orientations without materially affecting the flow of water through rotatable nozzle 32. Also, positioning the pattern of a plurality of relatively small diameter openings 42 at the bottom portion provides for a dispersed horizontally elongated water spray pattern while positioning the pattern of a plurality of relatively small diameter openings 42 substantially 90° from the bottom position, or at the side, provides for a dispersed substantially circular water spray. It is also possible to obtain intermediate dispersed water spray patterns by positioning the pattern of a plurality of relatively small diameter opening 42 at other positions between the bottom and the side positions described above.

Each of the plurality of relatively small diameter openings 42 is preferably surrounded by inner recess portion 44 and outer portion 46 which is thicker than inner recess portion 44. As shown in FIG. 4, the pattern of a plurality of relatively small diameter openings 42 is preferably symmetrical and includes a total of fifty-nine (59) relatively small diameter openings 42. Relatively small diameter openings 42 are preferably approximately 0.030 inches in diameter, inner recess portion 44 is approximately 0.020 inches thick and outer portion 46 is approximately 0.070 inches thick.

Body portion 12 and rotatable nozzle 32 can be fabricated from a wide range of suitable plastic materials. Also, if desired, body portion 12 and/or rotatable nozzle 32 can be fabricated from transparent and/or translucent materials. Similiarly, gasket 40 can be fabricated from a wide range of suitable elastomeric materials. During the molding process, removable and replaceable pins are used such that the axial direction of each of the plurality of relatively small diameter openings 42 is substantially perpendicular to the curved outer surface of rotatable nozzle 32. Consequently, each of the plurality of relatively small diameter openings 42 are substantially perpendicular to the curved outer surface of rotatable nozzle 32 at all points. This provides a larger water spray pattern, thus enabling a user to water a larger area. In many prior art rosette water spray nozzles, some of the small diameter openings would be obstructed or closed by material traveling below the pins during the molding process, thus causing flash or closure of a number of the openings. Applicant has found that the material flow into relatively thin inner recess portions 44 surrounding the plurality of relatively small diameter openings 42 causes the material to cool and, thus, lack sufficient energy to flash under the pins. Thus, flash and blockage of relatively small diameter openings 42 has during the molding been substantially eliminated. In addition, relatively thin inner recess portions 44 provide sufficient flexibility to permit rotatable nozzle 32 to be removed from the pins in the mold even though the pins, particularly toward the perimeter of the pattern of a plurality of relatively small diameter openings 42, are substantially perpendicular to the curved surface of rotatable nozzle 32, and, thus, extend at an angle to the axis along which rotatable nozzle 32 is removed from the mold.

To use watering container with a rotatable nozzle having a plurality of water delivery patterns 10, hollow interior fluid reservoir 14 is filled to a desired level with water and/or other fluids through fill opening 16. Volume indicators 48 are preferably molded directly into body portion 12 so they are visible from both the outside and inside of body portion 12 and allow the approximate volume of water in hollow interior fluid reservoir 14 to be estimated by comparing the water level in hollow interior fluid reservoir 14 with volume indicators 48 inside body portion 12. Rotatable nozzle 32 is then turned to align the desired water spray pattern with water spout opening 30. Watering container with a rotatable nozzle having a plurality of water delivery patterns 10 is then grasped on integral elongated handle 18, lifted and titled to dispense the water and/or fluid from hollow interior fluid reservoir 14 through water spout 20 and the selected water delivery pattern on rotatable nozzle 32 to pour the water and/or other fluids as desired.

Although the present invention has been described above in detail, the same is by way of illustration and example only and not to be taken as a limitation on the present invention. Accordingly, the scope and content of the present invention are to be defined only by the terms of the appended claims.

What is claimed is:

1. A watering container, comprising:
   a body portion having a hollow interior reservoir adapted to hold a predetermined volume of a liquid therein, said body portion including a fill opening which allows said hollow interior reservoir to receive liquid;
   a spout in communication with said hollow interior fluid reservoir and extending upwardly and outwardly therefrom; and
   an elongated handle attached to said body portion, said spout and said elongated handle being substantially aligned along a longitudinal axis and said fill opening being non-symmetrical with respect to said longitudinal axis.

2. The watering container in accordance with claim 1, wherein said fill opening encompasses a greater portion of said body portion to one side of said longitudinal axis as compared to the other side of said longitudinal axis.

3. The watering container in accordance with claim 1, wherein said body portion has a substantially symmetrical configuration.

4. The watering container in accordance with claim 1, further including a nozzle which is attached to an end of said spout distal from said hollow interior fluid reservoir.

* * * * *